(12) United States Patent
Kunnathur Ragupathi et al.

(10) Patent No.: US 10,241,554 B2
(45) Date of Patent: Mar. 26, 2019

(54) SYSTEM AND METHOD FOR INCREASING GROUP LEVEL POWER SUPPLY UNIT EFFICIENCY

(71) Applicant: Dell Products L.P., Round Rock, TX (US)

(72) Inventors: Dinesh Kunnathur Ragupathi, Round Rock, TX (US); Arun Muthaiyan, Round Rock, TX (US); Venkatesh Ramamoorthy, Round Rock, TX (US); Yogesh Prabhakar Kulkarni, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 247 days.

(21) Appl. No.: 15/177,551

(22) Filed: Jun. 9, 2016

(65) Prior Publication Data
US 2017/0357305 A1  Dec. 14, 2017

(51) Int. Cl.
*G06F 1/32* (2006.01)
*G06F 1/3209* (2019.01)

(52) U.S. Cl.
CPC ................................. *G06F 1/3209* (2013.01)

(58) Field of Classification Search
CPC ..... G06F 1/32; G06F 1/28; G06F 1/26; G06F 1/00
USPC ................................................. 713/300–375
See application file for complete search history.

(56) References Cited

U.S. PATENT DOCUMENTS

2013/0339776 A1\* 12/2013 Jagadishprasad ..... G06F 9/5094
713/340
2015/0082055 A1\* 3/2015 Grout ........................ G06F 1/26
713/300

\* cited by examiner

*Primary Examiner* — Jaweed A Abbaszadeh
*Assistant Examiner* — Keshab R Pandey
(74) *Attorney, Agent, or Firm* — Baker Botts L.L.P.

(57) ABSTRACT

A system may implement a method for analyzing group level power supply unit efficiency based on information about power supply units (PSUs) that supply power to servers in a server group, and loads in the system. A group level PSU efficiency analyzer may collect PSU related information from respective management controllers on the servers, including PSU capacity, type, or vendor, efficiency tables, load information, or the current efficiency of each PSU (compared to the peak efficiency for the PSU). The analyzer may calculate the group level PSU efficiency by averaging the PSU efficiencies of the member PSUs or by calculating an average of the PSU efficiencies that is weighted based on load. The analyzer may identify changes to the system configuration (e.g., swapping the PSUs that power some servers) that would increase or maximize the group level PSU efficiency using, for example, a graph search or tree search.

20 Claims, 9 Drawing Sheets

SYSTEM AND METHOD FOR INCREASING GROUP LEVEL POWER SUPPLY UNIT EFFICIENCY

BACKGROUND

Field of the Disclosure

This disclosure relates generally to information handling systems and, more particularly, to maximizing power supply unit efficiency in a server group.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems typically include one or more power supply modules. The efficiency of these power supply modules depends on the percentage of load (POL), which can vary greatly between different applications. The range of achievable efficiency for each of the power supply modules can also vary based on its type, capacity, manufacturer, and other factors.

SUMMARY

In one aspect, a disclosed method is for increasing power supply efficiency in an information handling system. The method may include obtaining, for each of a plurality of power supply units in server group in the information handling system, each of which supplies power to a respective one of a plurality of servers in the server group, information including: a respective value representing rated capacity, a respective value representing current steady state load, and data mapping load values to respective power supply efficiency values. The method may also include determining, based at least in part on the obtained information for each of the power supply units, a value representing current group level power supply efficiency, determining, based at least in part on the current group level power supply efficiency, whether or not reconfiguring the server group by modifying, for at least one of the servers, which of the power supply units supplies power to the one of the servers, would increase the group level power supply efficiency, and generating a reconfiguration recommendation in response to determining that reconfiguring the server group would increase the group level power supply efficiency.

In any of the disclosed embodiments, the method may further include obtaining, for each of the power supply units, a respective value of current power supply efficiency. Determining a value representing current group level power supply efficiency may include computing an average of the respective values of current power supply efficiency for each of the power supply units.

In any of the disclosed embodiments, the method may further include calculating, for each of the power supply units, dependent on the respective value representing its current steady state load and on the data mapping load values to respective power supply efficiency values for the power supply unit, a respective value of current power supply efficiency for the power supply unit. Determining a value representing current group level power supply efficiency may include computing an average of the respective values of current power supply efficiency for each of the power supply units.

In any of the disclosed embodiments, Determining that reconfiguring the server group would increase the group level power supply efficiency may include calculating an expected group level power supply efficiency for each of a plurality of configurations in which at least one of the servers is powered by a power supply unit other than a power supply unit that supplied power to the server in the current configuration of the server group, and comparing the expected group level power supply efficiencies for the plurality of configurations to the current group level power supply efficiency.

In any of the disclosed embodiments, determining that reconfiguring the server group would increase the group level power supply efficiency may include calculating an expected group level power supply efficiency for each of a plurality of configurations in which at least one of the servers is powered by a power supply unit other than a power supply unit that supplied power to the server in the current configuration of the server group. Generating a reconfiguration recommendation may include applying a graph searching technique or a tree searching technique to results of the calculating to identify a configuration in the plurality of configurations having the highest expected group level power supply efficiency.

In any of the disclosed embodiments, the method may further include writing data representing the reconfiguration recommendation to a local in memory that is accessible to an administrator or user of the information handling system.

In any of the disclosed embodiments, the method may further include repeating, one or more times, the obtaining information, the determining a value representing current group level power supply efficiency, the determining whether or not reconfiguring the server group would increase the group level power supply efficiency, and the generating a reconfiguration recommendation.

In any of the disclosed embodiments, the repeating may be performed periodically or in response to a change to a respective value representing current steady state load for one of the power supply units, a replacement of a power supply unit, or receipt of an explicit request to repeat the obtaining information, the determining a value representing current group level power supply efficiency, the determining whether or not reconfiguring the server group would increase the group level power supply efficiency, and the generating a reconfiguration recommendation.

Another disclosed aspect includes an information handling system including a plurality of servers in a server group, each including a respective management controller, a plurality of power supply units in the sever group, each of which supplies power to a respective one of the servers in the server group, and a lead management controller for the server group. The lead management controller may include a processor, and a memory storing program instructions that when executed by the processor cause the processor to implement a group level power supply efficiency analyzer. The group level power supply efficiency analyzer may obtain, for each of the power supply units, information including a respective value representing rated capacity, a respective value representing current steady state load, and data mapping load values to respective power supply efficiency values. The group level power supply efficiency analyzer may also determine, based at least in part on the obtained information for each of the power supply units, a value representing current group level power supply efficiency, determine, based at least in part on the current group level power supply efficiency, whether or not reconfiguring the server group by modifying, for at least one of the servers, which of the power supply units supplies power to the one of the servers, would increase the group level power supply efficiency over the current group level power supply efficiency, and generate, responsive to a determination that reconfiguring the server group would increase the group level power supply efficiency over the current group level power supply efficiency, a reconfiguration recommendation for the server group.

In any of the disclosed embodiments, when executed by the processor, the program instructions may further cause the processor to refrain from generating a reconfiguration recommendation for the server group responsive to a determination that reconfiguring the server group would not increase the group level power supply efficiency over the current group level power supply efficiency.

In any of the disclosed embodiments, when executed by the processor, the program instructions may further cause the processor to store one or more of the obtained information for each of the power supply units, the value representing current group level power supply efficiency, or the reconfiguration recommendation in the memory in the lead management controller.

In any of the disclosed embodiments, the information handling system may further include a management bus over which the lead management controller and the respective management controllers of the servers in the server group communicate with each other. To obtain the information for each of the power supply units, the group level power supply efficiency analyzer receives, from each of the respective management controllers in the server group, the information for a power supply that supplies power to the server on which the respective management controller resides.

In any of the disclosed embodiments, the obtained information for each of the power supply units may include vendor-supplied information stored in a memory on the power supply unit.

In any of the disclosed embodiments, the lead management controller may be one of the respective management controllers of the servers in the server group that has assumed the role of lead management controller for the server group.

In any of the disclosed embodiments, when executed by the processor, the program instructions may further cause the processor to calculate, for each of the power supply units, a respective value of current power supply efficiency. To determine a value representing current group level power supply efficiency, the group level power supply efficiency analyzer computes an average of the respective values of current power supply efficiency for each of the power supply units In any of the disclosed embodiments, to determine that reconfiguring the server group would increase the group level power supply efficiency, the group level power supply efficiency analyzer may calculate an expected group level power supply efficiency for each of a plurality of configurations in which at least one of the servers is powered by a power supply unit other than a power supply unit that supplied power to the server in the current configuration of the server group, and compare the expected group level power supply efficiencies for the plurality of configurations to the current group level power supply efficiency.

A further disclosed aspect includes a management controller. The management controller may include a group level power supply efficiency analyzer, including circuitry or logic to obtain, for each of a plurality of power supply units in a server group, each of which supplies power to a respective one of a plurality of servers, information including: a respective value representing rated capacity, a respective value representing current steady state load, and data mapping load values to respective power supply efficiency values. The group level power supply efficiency analyzer may also include circuitry or logic to determine, based at least in part on the obtained information for each of the power supply units, a value representing current group level power supply efficiency, to determine, based at least in part on the current group level power supply efficiency, whether or not reconfiguring the server group by modifying, for at least one of the servers, which of the power supply units supplies power to the one of the servers, would increase the group level power supply efficiency over the current group level power supply efficiency, and to generate, responsive to a determination that reconfiguring the server group would increase the group level power supply efficiency over the current group level power supply efficiency, a reconfiguration recommendation for the server group.

In any of the disclosed embodiments, the group level power supply efficiency analyzer may further include circuitry or logic to calculate, for each of the power supply units, a respective value of current power supply efficiency. To determine a value representing current group level power supply efficiency, the group level power supply efficiency analyzer may include circuitry or logic to compute an average of the respective values of current power supply efficiency for each of the power supply units.

In any of the disclosed embodiments, to determine that reconfiguring the server group would increase the group level power supply efficiency, the group level power supply efficiency analyzer further includes circuitry or logic to calculate an expected group level power supply efficiency for each of a plurality of configurations in which at least one of the plurality of servers is powered by a power supply unit other than a power supply unit that supplied power to the server in the current configuration of the server group, and apply a graph searching technique or a tree searching technique to results of the calculating to identify a configuration in the plurality of configurations having the highest expected group level power supply efficiency.

In any of the disclosed embodiments, the management controller may be a remote access controller.

BRIEF DESCRIPTION OF THE DRAWINGS

For a more complete understanding of the present invention and its features and advantages, reference is now made to the following description, taken in conjunction with the accompanying drawings, in which.

DESCRIPTION OF PARTICULAR EMBODIMENT(S)

Figure 1:
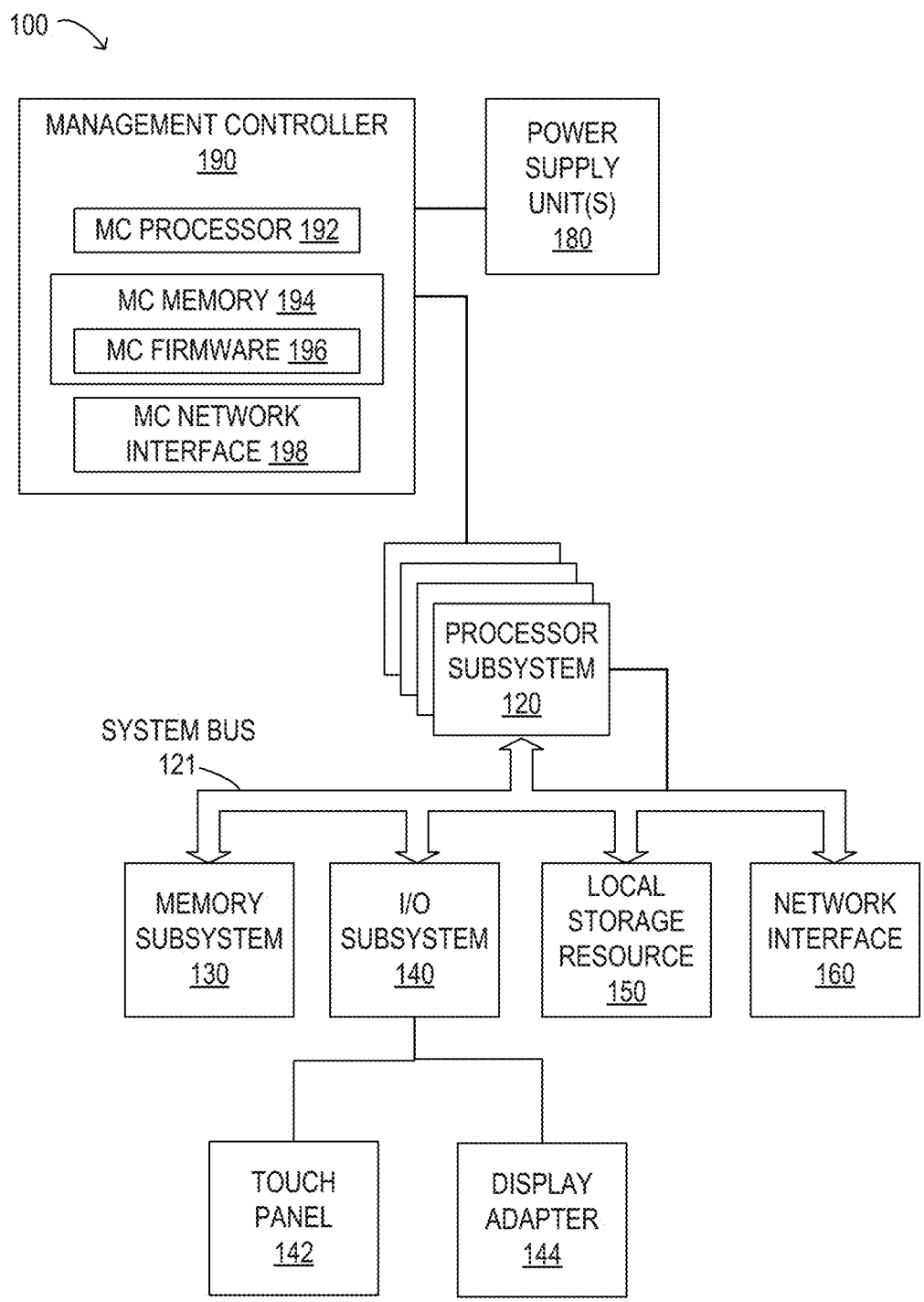
FIG. 1 is a block diagram of selected elements of an embodiment of an information handling system that includes one or more power supply units (PSUs) and a management controller.

In the following description, details are set forth by way of example to facilitate discussion of the disclosed subject matter. It should be apparent to a person of ordinary skill in the field, however, that the disclosed embodiments are exemplary and not exhaustive of all possible embodiments.

As used herein, a hyphenated form of a reference numeral refers to a specific instance of an element and the un-hyphenated form of the reference numeral refers to the collective or generic element. Thus, for example, widget "72-1" refers to an instance of a widget class, which may be referred to collectively as widgets "72" and any one of which may be referred to generically as a widget "72".

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

As will be described in further detail herein, the inventors of the present disclosure have developed methods and systems disclosed herein for analyzing, and making reconfiguration recommendations to increase, group level power supply unit efficiency based on information about multiple power supply units (PSUs) and loads in the system that are obtained from multiple servers. In at least some embodiments of the present disclosure, a group level PSU efficiency analyzer (which may be implemented in a lead management controller) may collect PSU related information from other management controllers in the system (e.g., a respective management controller in each of the multiple servers). In various embodiments, this information may include the capacity, type, and vendor of each PSU, an efficiency table for each PSU, user steady state load information for each PSU and/or the current efficiency of each PSU as compared to the peak efficiency that is achievable for the PSU. The group level PSU efficiency analyzer may then calculate the group level PSU efficiency by averaging the current efficiency of its member PSUs. In some embodiments, calculating the group level PSU efficiency may include calculating a weighted average of the current efficiency of the member PSUs (e.g., an average that is weighted based the current load points). The group level PSU efficiency analyzer may also identify any changes to the configuration of the system (e.g., swapping the PSUs that power at least some of the servers) that would maximize (or at least increase) the group level PSU efficiency for the system.

Particular embodiments are best understood by reference to FIGS. 1, 2, 3, 4, 5, 6A-6B, and 7A-7B, in which like numbers are used to indicate like and corresponding parts.

Turning now to the drawings, FIG. 1 illustrates a block diagram depicting selected elements of an embodiment of information handling system 100. As described herein, information handling system 100 may represent a personal computing device, such as a personal computer system, a desktop computer, a laptop computer, a notebook computer, etc., operated by a user. In various embodiments, information handling system 100 may be operated by the user using a keyboard and a mouse (not shown).

As shown in FIG. 1, components of information handling system 100 may include, but are not limited to, processor subsystem 120, which may comprise one or more processors, and system bus 121 that communicatively couples various system components to processor subsystem 120 including, for example, a memory subsystem 130, an I/O subsystem 140, local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

In FIG. 1, network interface 160 may be a suitable system, apparatus, or device operable to serve as an interface between information handling system 100 and a network (not shown). Network interface 160 may enable information handling system 100 to communicate over the network using a suitable transmission protocol and/or standard, including, but not limited to, transmission protocols and/or standards enumerated below with respect to the discussion of network 155. In some embodiments, network interface 160 may be communicatively coupled via the network to a network storage resource (not shown). The network coupled to network interface 160 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). The network coupled to network interface 160 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. The network coupled to network interface 160 and/or various components associated therewith may be implemented using hardware, software, or any combination thereof.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130). In the same or alternative embodiments, processor subsystem 120 may interpret and/or execute program instructions and/or process data stored remotely (e.g., in a network storage resource, not shown).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down. Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. In system 100, I/O subsystem 140 may comprise a system, device, or apparatus generally operable to receive and/or transmit data to/from/ within information handling system 100. I/O subsystem 140 may represent, for example, a variety of communication interfaces, graphics interfaces, video interfaces, user input interfaces, and/or peripheral interfaces. As shown, I/O subsystem 140 may comprise touch panel 142 and display adapter 144. Touch panel 142 may include circuitry for enabling touch functionality in conjunction with a display device that is driven by display adapter 144. It is noted that when information handling system 100 is a laptop computer with an integrated display device, display adapter 144 may provide connectivity for an external display.

As illustrated in FIG. 1, system 100 may also include a management controller (MC) 190, which may include which may include MC processor 192 as an additional processor included with information handling system 100 for certain management tasks. MC processor 192 may have access to MC memory 194, which may store MC firmware 196, representing instructions executable by MC processor 192 to implement analyzing, and making reconfiguration recommendations to increase, group level power supply unit efficiency, as described herein. MC memory 194 may also store information usable by MC firmware 196 in analyzing, and making recommendations to increase, group level power supply unit efficiency, such as efficiency table for PSUs 180, vendor-supplied information about PSUs 180, steady state load information, calculated PSU efficiency information, and recommendations for reconfiguring a server group to increase group level PSU efficiency.

In some embodiments, MC memory 194 may further store pre-boot instructions executable by MC processor 192, for example, for preparing information handling system 100 to boot by activating various hardware components in preparation of launching an operating system for execution (e.g., a basic input/output system (BIOS)). In some embodiments, MC memory 194 may store a Unified Extensible Firmware Interface (UEFI) according to a specification promulgated by the UEFI Forum (uefi.org). Also included with management controller 190 is MC network interface 198, which may be a secondary network interface to network interface 160. MC network interface 198 may provide 'out-of-'band' network access to management controller 190, for example, even when network interface 160 is unavailable. Thus, management controller 190 may execute MC firmware 196 on MC processor 192 and use MC network interface 198 even when other components in information handling system 100 are inoperable.

In some embodiments, management controller 190 may support any suitable protocol or standard including, for example, the Intelligent Platform Management Interface (IPMI) architecture, to communicate with sensors in PSUs 180 or elsewhere for monitoring and control purposes. In some embodiments, management controller 190 may use an I$^2$C interface to communicate with sensors in PSUs 180, or elsewhere, or to access information that was programmed into PSUs 180 when they were manufactured. In some embodiments, management controller 190 may include, or be an integral part of, a baseboard management controller (BMC) and may determine a power down sequence for information handling system 100, or portions thereof. In some embodiments, management controller 190 may implement the functionality of an access controller. For example, management controller 190 may represent an instance of an Integrated Dell Remote Access Controller (iDRAC). As such, management controller 190 may, in some embodiments, be configured to permit an administrator or other person to remotely monitor and/or remotely manage information handling system 100 regardless of whether information handling system 100 is powered on and/or has an operating system installed thereon. In some embodiments, management controller 190 may allow an administrator to remotely manage one or parameters associated with operation of information handling system 100 (e.g., power usage, processor allocation, memory allocation, security privileges, etc.). In some embodiments, management controller 190 may include power distribution circuitry, and may control the allocation of power generated by one or more of the power supply units (PSUs) 180 to other resources in system 100.

Figure 2:
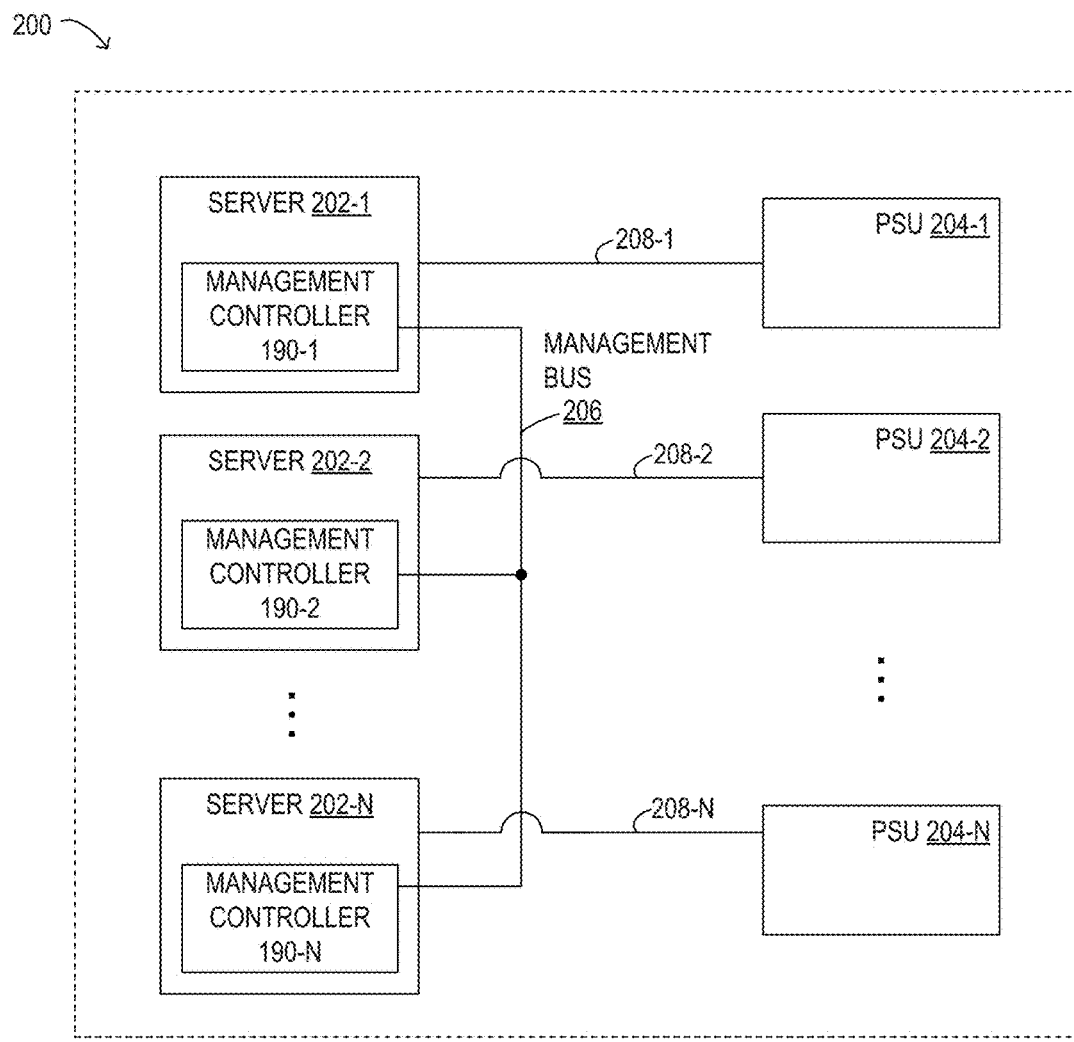
FIG. 2 is a block diagram of selected elements of an embodiment of a server group.

FIG. 2 is a block diagram of selected elements of an example embodiment of an information handling system configured to implement a server group. In this example, server group 200 includes multiple power supply units (PSUs) 204 (shown as PSUs 204-1 to 204-N) and multiple servers 202 (shown as servers 202-1 to 202-N), each of which includes a respective management controller (MC) 190. In some embodiments, the PSUs 204 may be similar to the PSUs 180 illustrated in FIG. 1, and the management controllers (shown as 190-1 to 190-N) may be similar to management controller 190 illustrated in FIG. 1 and described above. As illustrated in this example, management controllers 190-1 to 190-N may communicate with each other over a dedicated management bus 206 (e.g., via their respective MC network interfaces 198). For example, the MCs 190 may exchange information usable in analyzing, and making recommendations to increase, group level power supply unit efficiency, as described herein. In this example embodiment, each of the n servers 202 is powered by a respective one of the n PSUs 204. More specifically, PSU 204-1 provides power to server 202-1 over a power bus 208-1, PSU 204-2 provides power to server 202-2 over a power bus 208-2, and PSU 204-N provides power to server 202-N over a power bus 208-N. In some embodiments, servers 202 may be rack-mounted servers. In other embodiments, servers 202 may be blade servers.

In this example embodiment, any or all of the management controllers 190 may implement all or a portion of a group level PSU efficiency analyzer, which may include circuitry and/or logic to determine the individual PSU efficiency of its PSU, to determine the group level PSU efficiency for server group 200 and/or to recommend a reconfiguration of the servers and PSUs in server group 200 to increase the group level PSU efficiency for server group 200, as described herein. In some embodiments, one of the management controllers 190 may act as a "lead management controller" or a "group level management controller" that performs management functions on behalf of all of the servers 202 and/or PSUs 204 of server group 200. In other embodiments, the management controller may be implemented as (or within) a "remote access controller" that performs management functions on behalf of (and between) various rack servers.

Figure 3:
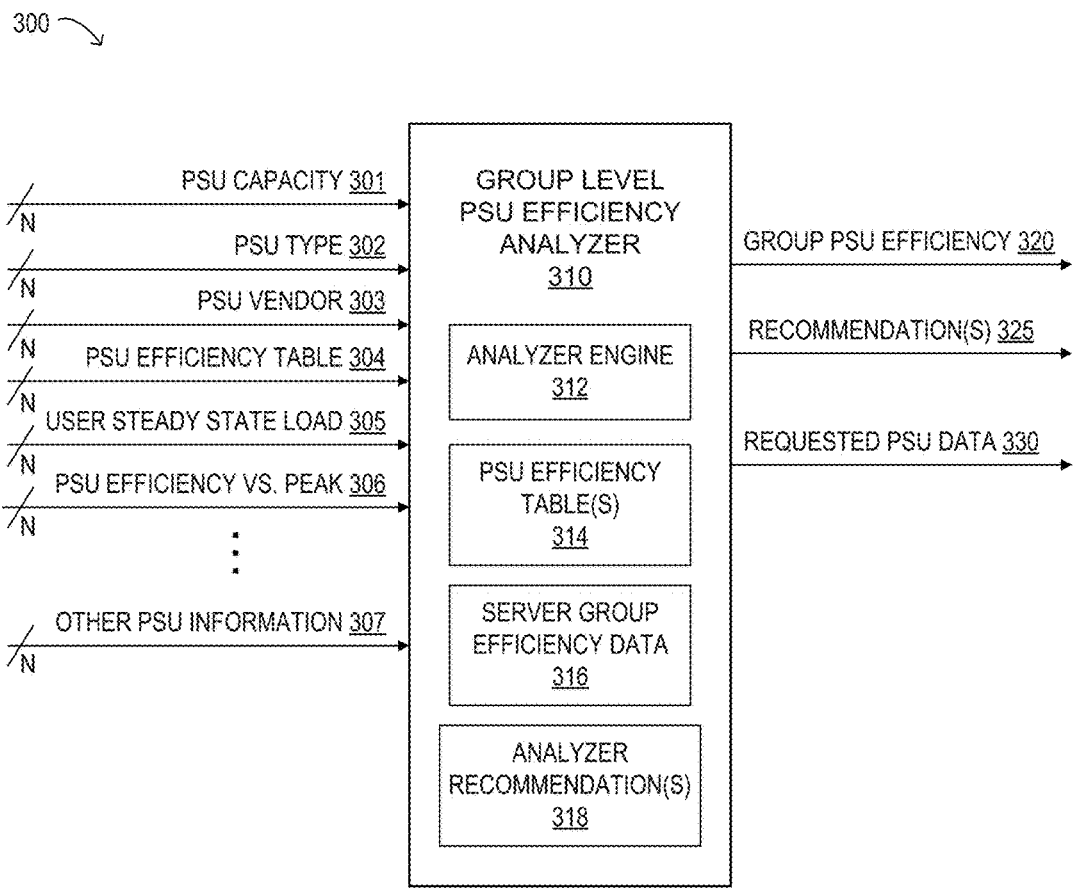
FIG. 3 is a block diagram of selected elements of an embodiment of a group level PSU efficiency analyzer.

In at least some embodiments, the systems and methods described herein may be used to analyze, and make recommendations to increase, the group level power supply unit efficiency (e.g., in a server group). FIG. 3 is a block diagram of selected elements of an embodiment of a group level PSU efficiency analyzer 310, according to at least some embodiments. PSU efficiency analyzer 310 may be implemented in a group level (lead) management controller 190 using any combination of hardware and software elements, in different embodiments. For example, in some embodiments, PSU efficiency analyzer 310 may include hardware circuitry or logic to determine an optimum group level PSU efficiency for a server group based, at least in part, on information received from other management controllers 190. In other embodiments, PSU efficiency analyzer 310 (or the management controller in which PSU efficiency analyzer 310 is implemented) may include a processor and a memory stores program instructions executable by the processor to analyze, and make recommendations to increase, the group level power supply unit efficiency based, at least in part, on information received from other management controllers 190.

In this example, the inputs to PSU efficiency analyzer 310 may include, from the respective management controller in each of n servers of the server group, vendor-supplied information about their PSUs. For example, the inputs to PSU efficiency analyzer 310 may include, from each management controller, an indication of the PSU capacity (shown as 301), an indication of the PSU type (shown as 302), and an indication of the PSU vendor (shown as 303). In some embodiments, this information may be programmed into each of the PSUs when they are manufactured. In some embodiments, this information may be accessed by pre-boot instructions executable by memory controller (e.g., over an I²C interface). In addition, the inputs from each management controller may include a PSU efficiency table 304 that maps percentage of rated load to PSU efficiency. For example, a power budget table may be developed for each system, platform, or server group that includes information indicating the types of PSUs it can support and, for each such PSU, an efficiency table that the PSU supports. In some embodiments this information may be stored in memory in some or all of the memory controllers in the system, platform, or server group (e.g., in MC memory 194, as part of MC firmware 196). In some embodiments, each of these efficiency tables for a given PSU may be stored as a two-dimensional array indicating the PSU efficiency at different load points (e.g., for different values of POL).

In some embodiments, the inputs from each management controller may include an indication of a user steady state load 305 that was calculated on the management controller and/or an indication of the PSU efficiency (or the PSU efficiency vs. peak efficiency) for its PSU (shown as 306). The load (POL) is based on the power consumption, which, in some embodiments may be determined by reading the values of various sensors in the PSU. In some embodiments, each PSU may provide information about its power consumption (e.g., periodically or continuously) to the management controller in the server to which it supplies power, and that management controller may use this information (along with the capacity of the PSU) to calculate the current load at any given point. In some embodiments, the management controllers may communicate with each other share this information, and some or all of the management controllers (including, at least, the lead management controller) may maintain this information for the entire group. In some embodiments, an indication of the current PSU efficiency vs. peak efficiency for a given PSU may be calculated as the difference between the efficiency at the peak (as found in the efficiency table for the PSU, or by extrapolation therefrom) and the current PSU efficiency (as found in the efficiency table for the PSU based on the load). In various embodiments, after the indication of the user steady state load 305 and/or the indication of the PSU efficiency (or the PSU efficiency vs. peak efficiency) 306 are calculated by the management controller on a given server, this information may be communicated to the lead management controller. The PSU efficiency analyzer 310 on the lead management controller may then determine whether and/or how to reconfigure the server group to improve the group level PSU efficiency.

In other embodiments, more, fewer, or different inputs (including other PSU information 307) may be input to PSU efficiency analyzer 310. In at least some embodiments, all of the inputs received by PSU efficiency analyzer 310 on the lead management controller from the other management controllers may be communicated to the lead management controller over a management bus, such as management bus 206 illustrated in FIG. 2.

In the example embodiment illustrated in FIG. 3, PSU efficiency analyzer 310 includes storage for various PSU efficiency tables (shown as 314) and for the results of its calculations (shown as server group efficiency data 316 and analyzer recommendations 318). PSU efficiency analyzer 310 also includes an analyzer engine 312 that performs the calculations described herein for determining the group level PSU efficiency for a server group and generates recommendations for reconfiguring the server group to increase the group level PSU efficiency (assuming the current group level PSU efficiency is not equal to the determined maximum group level PSU efficiency).

In some embodiments, the PSU efficiency analyzer 310 may calculate the group level PSU efficiency by calculating an average of the current PSU efficiencies of its member PSUs. In some embodiments, the PSU efficiency analyzer 310 may calculate the group level PSU efficiency by calculating a weighted average of the current PSU efficiencies of the member PSUs (e.g., an average that is weighted based the current load points). Subsequently, any of a variety of methods may be applied by the PSU efficiency analyzer 310 to determine a configuration for the server group that maximizes (or at least increases) its group level PSU efficiency. In one embodiment, PSU efficiency analyzer 310 may apply a breadth first search with pruning, although other algorithms may be applied to identify an optimal (or improved) configuration for the server group in other embodiments, including other types of graph or tree searching algorithms. For example, in some embodiments, PSU efficiency analyzer 310 may cycle through all possible combinations of servers and PSUs, calculating the expected PSU efficiency for each combination based on the current loads at each server, the PSU efficiency tables for each PSU, and/or other relevant information. Based on these calculations, the PSU efficiency analyzer 310 may identify the configuration that would maximize the group level PSU efficiency, and may output a reconfiguration recommendation describing that configuration.

The outputs of PSU efficiency analyzer 310 may include an indication of the determined group level PSU efficiency (shown as 320). In some embodiments, outputting this indication may include writing a value representing the determined group level PSU efficiency to a register or memory location (e.g., in MC memory 194) from which it can be read by a user or otherwise accessed (e.g., through a GUI or scripted interface of the lead management controller).

In some embodiments, the outputs of PSU efficiency analyzer 310 may include a recommendation of a configuration change that would increase the group level PSU efficiency (shown as 325). In some embodiments, the recommendation may indicate the amount by which the group level PSU efficiency would be increased if the recommendation were acted on. Again, outputting this indication may include writing a value representing the determined group level PSU efficiency to a register or memory location (e.g., in MC memory 194) from which it can be read by a user or otherwise accessed (e.g., through a GUI or scripted interface of the lead management controller). In some embodiments, the PSU efficiency analyzer 310 may output other data related to the PSU or the analysis of the PSU efficiency of the server group or of any of the server/PSU combinations thereof. For example, in some embodiments, by issuing a command through a GUI or scripted interface of the lead management controller, a user may request access to any of the information collected by PSU efficiency analyzer 310 or the results of calculations made by PSU efficiency analyzer 310 based on that information. In response, the requested information may be output as 330 (e.g., it may be returned through the GUI or scripted interface of the management controller or written out to a register or memory location from which it can be read by a user).

While in the example illustrated in FIG. 3 and described above, the lead management controller receives some or all of the raw data collected at the other management controllers in the server group (and may also receive the results of calculations performed by those management controllers for their PSUs), in other embodiments, the raw data may not be sent to the lead management controller and/or the lead management controller may perform those calculations as well as the group level calculations described herein. As previously noted, in some embodiments, each of the management controllers may be implemented as (or within) a "remote access controller" that performs management functions on behalf of (and between) servers (e.g., various rack servers) in a server grouping. In general, however, the lead management controller described herein may be any console that groups servers for the purposes of collectively managing their resources, and that includes a group level PSU efficiency analyzer 310.

Figure 4:
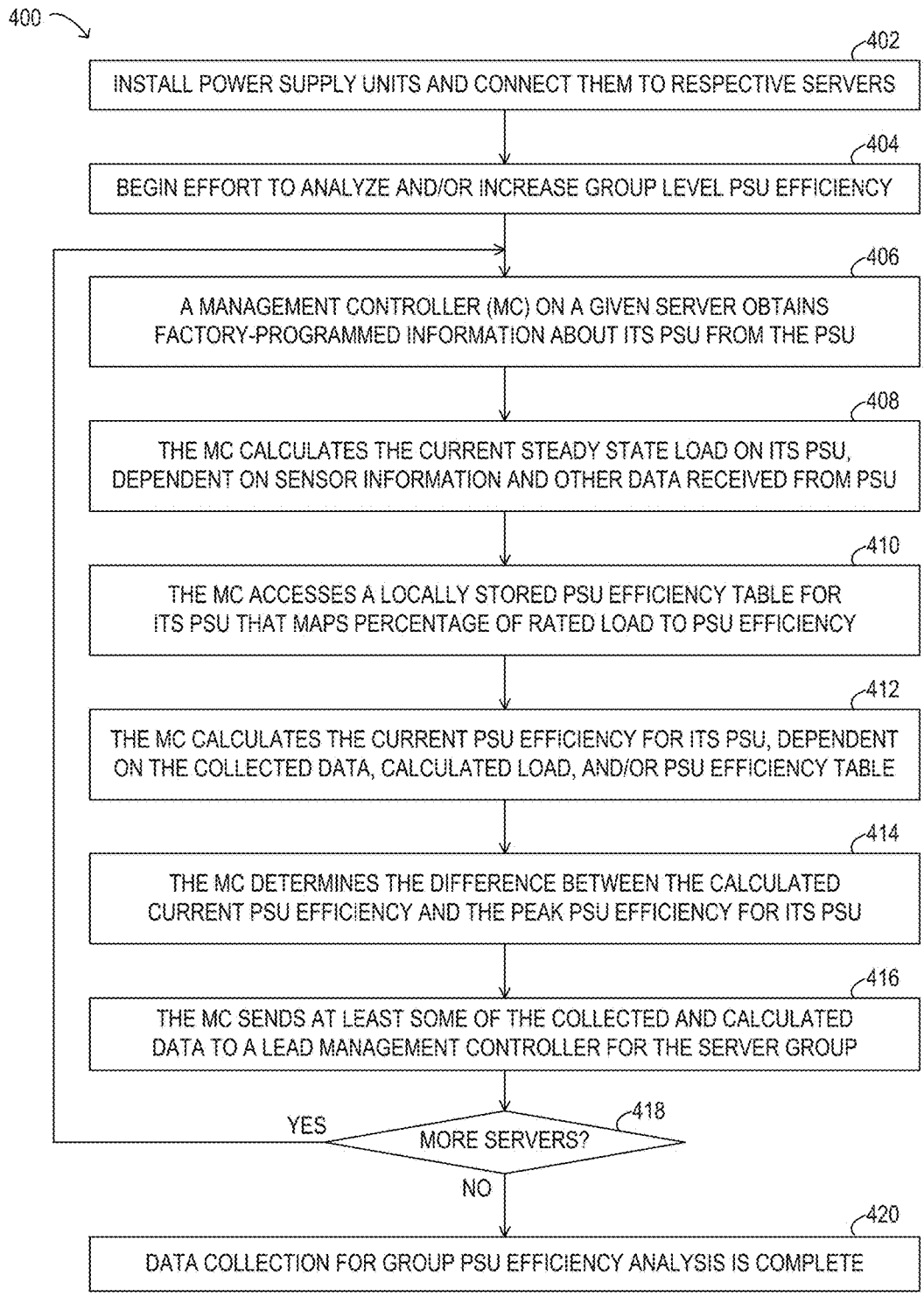
FIG. 4 is flowchart depicting selected elements of an embodiment of a method for providing inputs to a group level PSU efficiency analyzer.

Referring now to FIG. 4, a block diagram of a method 400 for providing inputs to a group level PSU efficiency analyzer, as described herein, is depicted in flowchart form. In various embodiments, method 400 may be performed by a respective management controller 190 of one or more instances of an information handling system 100 (see FIG. 1) or by a management controller 190 of one or more of the servers 202 in a server group 200 (see FIG. 2). It is noted that certain operations described in method 400 may be optional or may be rearranged in different embodiments.

As illustrated in the example embodiment depicted in FIG. 4, method 400 may begin (at 402) with the installation of one or more Power Supply Unit(s) (PSUs) in a system and the connection the PSUs to respective servers in a server group. Method 400 may include (at 404), beginning an effort to analyze and/or increase group level PSU efficiency in the server group. In some embodiments, such an analysis may be invoked in response to the execution (by a processor in the system) of a command defined according to an application programming interface. In method 400 (at 406), the management controller on a given one of the servers in the server group obtains factory-programmed information about its PSU from the PSU. In at least some embodiments, this information may include an indication of the PSU capacity, an indication of the PSU type, and/or an indication of the PSU vendor.

In method 400 (at 408), the management controller calculates the current steady state load on its PSU (e.g., in terms of the percentage of load, or POL), dependent on sensor information and other data received from the PSU. In method 400 (at 410), the management controller accesses a locally stored PSU efficiency table for its PSU that maps percentage of rated load to PSU efficiency. At 412, the management controller calculates the current PSU efficiency for its PSU, dependent on the collected data, the calculated load, and/or the PSU efficiency table for the PSU. In method 400 (at 414), the management controller determines the difference between the calculated current PSU efficiency and the peak PSU efficiency for its PSU (e.g., as indicated in the PSU efficiency table for the PSU). At 416, the management controller sends at least some of the collected and calculated data to a lead management controller for the server group. For example, in one embodiment, the management controller sends only the calculated current PSU efficiency and/or the calculated current steady state load (POL) to the lead management controller. In other embodiments, the management controller may send to the management controller the data usable to calculate the current PSU efficiency and/or the current steady state load (POL) instead of, or in addition to, the results of these calculations. In some embodiments, the management controller may send the information to the lead management controller over a management bus, such as management bus 206 (see FIG. 2).

As illustrated in FIG. 4, if (at 418) there are more servers in the server group, the operations shown as 406-416 may be repeated for each additional server in the server group. Once these operations have been performed for all of the servers in the server group, the data collection for the group PSU efficiency analysis is complete (at 420). Note that while this example describes the application of a method for determining the group level PSU efficiency for a server group in which there is a 1-1 mapping between servers and PSUs, in other embodiments, there may be multiple PSUs powering at least some of the servers in the server group. In such embodiments, the calculation of PSU efficiency (and other local calculations) for each PSU that provides power to a given server may be performed by the management controller for the server and the results provided to the lead management controller. In still other embodiments, a single PSU may power multiple servers in the server group. In such embodiments, the management controller on one of the servers to which it supplies power (or the lead management controller for the server group) may obtain load information from all of the servers to which the single PSU supplies power, and may perform the calculation of PSU efficiency (and other local calculations) for that PSU.

In some embodiments, the operations illustrated in FIG. 4 may be performed periodically (and/or continuously) on each of the management controllers on the servers in the server group to supply up-to-date information to the group level management controller (or a group level PSU efficiency analyzer 310 thereof). In another embodiment, the operations illustrated in FIG. 4 may be performed one or more times by the management controllers on one or more of the severs in response to a request from the group level management controller for up-to-date information with which to perform an analysis, or in response to a significant change at one of the servers or PSUs (e.g., if a PSU is swapped out or if the load at one of the servers changes significantly). In yet another embodiment, the operations illustrated in FIG. 4 may be performed in response to the execution (by a processor in the system) of a command defined according to an application programming interface.

As described herein, in at least some embodiments, after receiving (or calculating) the PSU efficiency for all of the existing server/PSU combinations in the server group, the group level PSU efficiency analyzer 310 may calculate the group level PSU efficiency (e.g., by averaging or otherwise aggregating the individual PSU efficiency values over the total load for the server group). The group level PSU efficiency analyzer 310 may then determine whether or not the current configuration yields the maximum achievable group level PSU efficiency for the server group and, if not, to generate a reconfiguration recommendation for the server group that would maximize (or at least increase) the group level PSU efficiency.

In some embodiments, the analysis and recommendation processes described herein may be performed only once for a given system or application, e.g., following an initial boot of a system that includes a server group. In other embodiments, these processes may be performed multiple times during operation of the server group resources. For example, in various embodiments, the analysis and recommendation processes described herein may be performed in response to explicit requests from an IT administrator or other user of the system, or may be performed periodically to ensure that the group level PSU efficiency remains high even in the face of changing conditions. In some embodiments, the analysis and recommendation processes described herein may be performed by the group level PSU efficiency analyzer 310 in response to receiving updated information from one or more of the management controllers on the servers in the server group. In some embodiments, the results of each such analysis (e.g., the current group level PSU efficiency and/or information about any recommended reconfiguration) may be stored by the lead management controller (e.g., in MC memory 194) for subsequent retrieval by an IT administrator or other user. In some embodiments, each time the results are generated, they may be shared with one or more of the other management controllers in the server group.

In some embodiments, whenever the IT administrator or user logs into the lead management controller console (e.g., through a GUI), they may be presented with the option to view the latest recommendation (and/or the supporting data for that recommendation), after which they may decide whether or not to act on the recommendation. For example, if something has changed in the system since the last time the IT administrator or user logged into the lead management controller console (e.g., if the load changed significantly on one of the servers or a PSU was swapped out), the latest recommendation may be different from one that was generated for the server group during a previous analysis. Conversely, if nothing has changed in the system since the last time the IT administrator or user logged into the lead management controller console, and if the group level PSU efficiency is at the maximum achievable PSU efficiency for the server group, there may be no difference between the latest recommendation and one that was generated for the server group during a previous analysis. In some embodiments, the IT administrator or user may decide not to act on the latest recommendation, regardless of whether or not it has changed recently, if the current group level PSU efficiency is near the maximum achievable PSU efficiency (e.g., if the power savings that could be realized would not justify the costs associated with reconfiguring the server group in terms of downtime or other factors).

Figure 5:
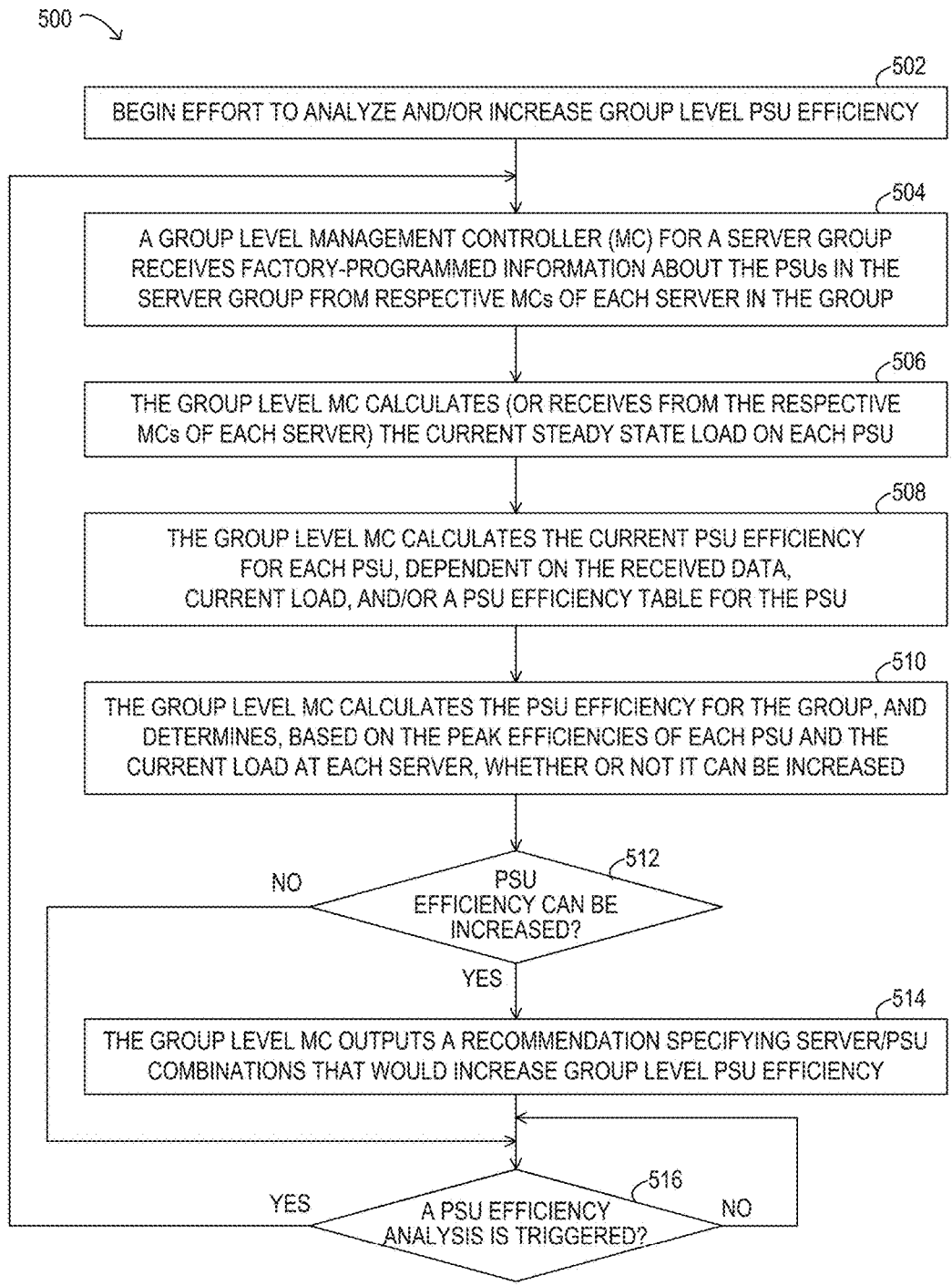
FIG. 5 is flowchart depicting selected elements of an embodiment of a method for analyzing and increasing group level PSU efficiency.

Referring now to FIG. 5, a block diagram of selected elements of an embodiment of a method 500 for analyzing and increasing group level PSU efficiency, as described herein, is depicted in flowchart form. In various embodiments, method 500 may be performed by group level PSU efficiency analyzer 310 (see FIG. 3), which may be implemented within a respective management controller 190 of one or more instances of an information handling system 100 (see FIG. 1) or within a management controller 190 of one or more of the servers 202 in a server group 200 (see FIG. 2). It is noted that certain operations described in method 500 may be optional or may be rearranged in different embodiments.

As illustrated in the example embodiment depicted FIG. 5, method 500 includes (at 502) beginning an effort to analyze and/or increase group level PSU efficiency in the server group. In some embodiments, such an analysis may be invoked in response to the execution (by a processor in the system) of a command defined according to an application programming interface. At 504, the method includes a group level management controller (MC), also referred to herein as a lead management controller, for a server group receiving factory-programmed information about the PSU in the server group from the respective management controllers of each server in the server group. In some embodiments, one of the management controllers in one of the servers may declare itself the lead management controller for the group, in which case this management controller (or a group level PSU efficiency analyzer 310 thereof) may perform the analysis illustrated in FIG. 5. In other embodiments, the group level management controller may be distinct from the management controllers that reside in the servers of the server group.

In method 500 (at 506), the group level management controller calculates (or receives from the respective management controller of each server) the current steady state load on each PSU in the server group. For example, in some embodiments, the management controller of each server may send to the group level management controller the calculated current steady state load (POL) for its PSU. In other embodiments, the management controller of each server may send to the group level management controller the data usable to calculate the current steady state load (POL) of its PSU rather than the result of such a calculation. In this case, the group level management controller (or a group level PSU efficiency analyzer 310 thereof) may calculate the current steady state load on each PSU in the server group. In method 500 (at 508), whether or not the management controller of each server sent to the group level management controller the calculated current PSU efficiency for its PSU, the group level management controller (or a group level PSU efficiency analyzer 310 thereof) may calculate the current PSU efficiency for each PSU, dependent on the received data, the current load (POL) and/or a PSU efficiency table for the PSU.

In method 500 (at 510), the group level management controller (or a group level PSU efficiency analyzer 310 thereof) calculates the PSU efficiency for the group, and determines, based on the peak efficiencies of each PSU and the current load at each server, whether or not group level PSU can be increased. If (at 512) it is determined that the PSU efficiency for the group is less than the maximum PSU efficiency that can be achieved for the sever group (based on the available PSUs and the loads at each server), method 500 includes (at 514) the group level management controller outputting a recommendation specifying server/PSU combinations that would increase group level PSU efficiency. For example, in one embodiment, the group level management controller (or a group level PSU efficiency analyzer 310 thereof) may calculate what the PSU efficiency would be for the group for all possible configurations (e.g., all possible pairings between the servers and PSUs in the sever group) to determine which configuration results in the highest group level PSU efficiency. If that configuration does not match the current configuration of the server group, a recommendation to reconfigure the server/PSU combinations in the server group may be output by the group level management controller (or a group level PSU efficiency analyzer 310 thereof). In one embodiment, each time the configuration that results in the highest group level PSU efficiency is determined, a recommendation may be written out to a memory location from which it may be subsequently read, after which it may be up to a user to read the recommendation and to decide whether or not to act on the recommendation. In some embodiments, the recommendation may include an indication of the difference between the current group level PSU efficiency and the PSU efficiency that would be achieved for the sever group if the recommendation were acted upon. In this case, the user may base their decision about whether or not to act on the recommendation on the expected increase in group level PSU efficiency, and the cost savings associated with that increase.

In method 500, at some point after a recommendation to reconfigure the server/PSU combinations in the server group is output (or after determining that no such reconfiguration is needed), another group level PSU efficiency analysis may be triggered (as shown in 516). For example, in one embodiment, a group level PSU efficiency analysis may be triggered periodically on the group level management controller or on each of the management controllers on the servers in the server group. In another embodiment, a group level PSU efficiency analysis may be triggered when data received from one of the management controllers on the servers in the server group is significantly different from the data received earlier (e.g., if a PSU is swapped out or if the load at one of the servers changes significantly). In yet another embodiment, a group level PSU efficiency analysis may be triggered in response to the execution (by a processor in the system) of a command defined according to an application programming interface. In some embodiments, absent such triggers, no further analysis of the group level PSU efficiency may be performed.

As previously noted, in various embodiments, the management controllers described herein may include one or more interfaces through which an IT administrator, customer, or other user can interact with or control various resources in the server group. For example, in some embodiments, the management controller may provide an application programming interface (API), a graphical user interface (GUI), and/or a scripting-language interface through which the analysis and recommendation processes described herein may be invoked and/or their results may be obtained. In one embodiment, an API or GUI element may be included through which a user may request the invocation of these processes, e.g., and API to "check my efficiency", "recommend a new configuration", or "show me the latest configuration recommendation." In some embodiments, an API or GUI element may be included through which a user may request access to any or all of the PSU related data that is collected and/or calculated by the management controllers in the servers and/or by the lead management controller. In some embodiments, a console of the lead management controller (or another management controller) may support the display of this data over time or in various snapshots, in response to a request to access the data.

Figure 6A:
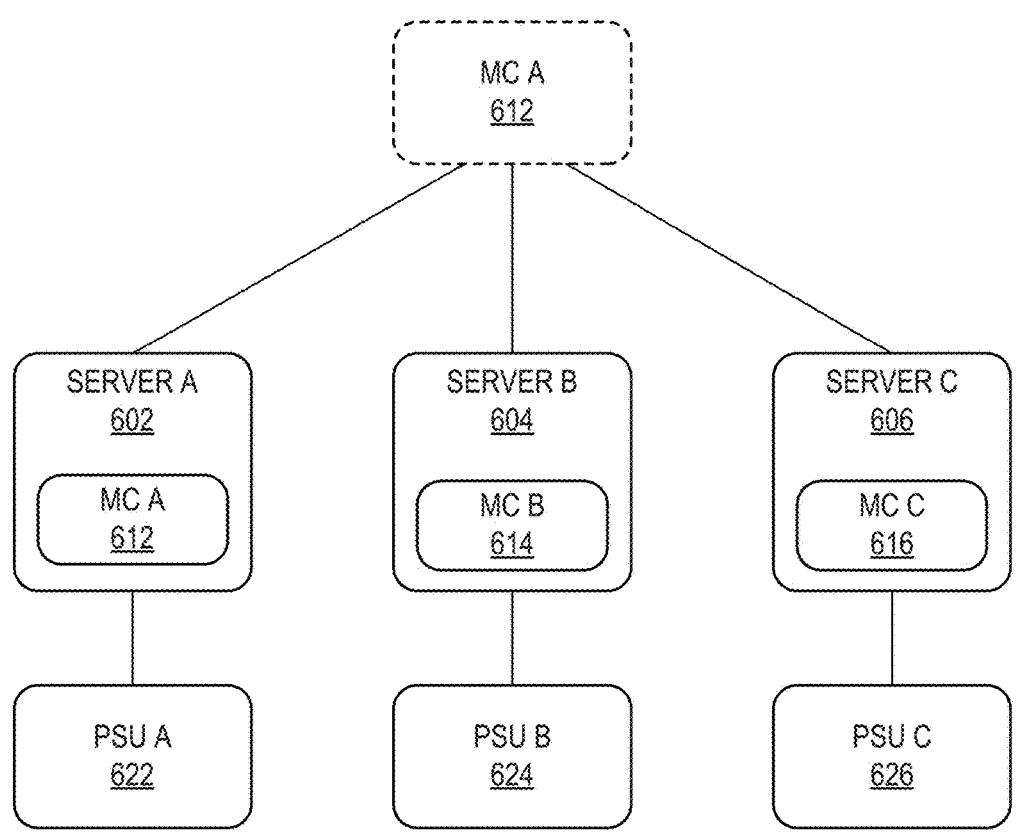
FIGS. 6A-6B and 7A-7B illustrate examples of the use of a group level PSU efficiency analyzer to increase group level PSU efficiency, according to at least some embodiments.

FIGS. 6A-6B and 7A-7B illustrate examples of the use of a group level PSU efficiency analyzer to increase group level PSU efficiency, according to at least some embodiments. More specifically, FIG. 6A illustrates selected elements of a server group 600 prior to the application of a recommended reconfiguration to increase group level PSU efficiency. server group 600 includes three servers, each of which includes an instance of a management controller that implements a group level PSU efficiency analyzer, and three PSUs. In this example, any of the three PSU can supply power to any one of the three servers, but changing the configuration (the pairings between them) may require a manual process to swap the physical components in the system. In this example, server A (602) includes management controller A (612) and (prior to the reconfiguration) is powered by PSU A (622). Similarly, server B (604) includes management controller B (614) and is powered by PSU B (624) and server C (606) includes management controller C (616) and is powered by PSU C (626).

As previously noted, in some embodiments, the management controllers may communicate with each other over a management bus (such as management bus 206 in FIG. 2). For example, the management controllers may exchange information with each other so that at least one of the management controllers (the lead management controller) knows which servers are powered by each of the PSUs in the server group. In some embodiments, through an exchange of messages consistent with a leader selection protocol or a leader election protocol, one of the management controllers may be elected (or may declare itself) to be the lead management controller for a server group. In the example illustrated in FIGS. 6A-6B and 7A-7B, management controller A (612) serves as the group level (lead) management controller. This is illustrated in the figures by the dashed outline around management controller A (612) in the group lead position.

In this example, the three power supply units have different capacity ratings. For example, PSU A (622) is rate for a load of 750 watts, PSU B (624) is rated for a load of 1100 watts, and PSU C (626) is rated for a load of 495 watts. For each of these PSUs, there is an efficiency curve inherent in the PSU, which is typically not strictly a bell curve. For each PSU, there is an optimum load point on the efficiency curve at which the maximum PSU efficiency is achievable. These curves (or tables representing the curves) and/or an indication of the optimum load points for each PSU may be provided by the PSU vendors and may include data collected by them during testing. In one example, the y axis in these tables may represent PSU efficiency and the x axis may represent the corresponding load (or percentage of load).

Figure 6B:
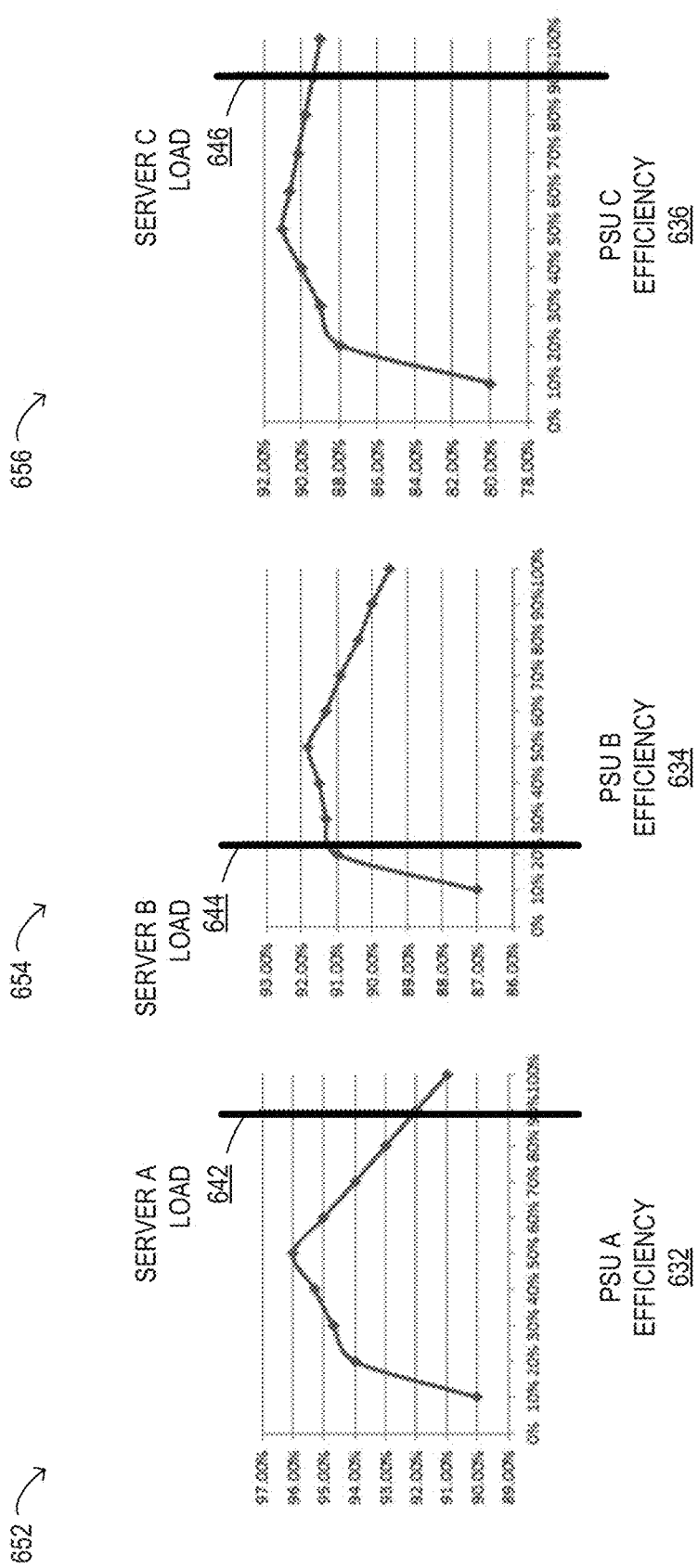

FIG. 6B illustrates the PSU efficiency curves for the three PSUs in server group 600, in one example. In this example, each of the PSUs may achieve their peak PSU efficiency when the POL is in the range of 50-55% (e.g., when they are approximately half-loaded). In this example, graph 652 depicts the PSU efficiency curve 632 for PSU A, on which the POL (for server A) is shown at load point 642. Here, prior to reconfiguring server group 600, the POL for server A is 90%, and the PSU efficiency at that load point is 92%, which is well below the peak efficiency of 96% for PSU A. Graph 654 depicts the PSU efficiency curve 634 for PSU B, on which the POL (for server B) is shown at load point 644. Here, prior to reconfiguring server group 600, the POL for server B is 22%, and the PSU efficiency at that load point is 91%, which is below the peak efficiency of about 92% for PSU B. Graph 656 depicts the PSU efficiency curve 636 for PSU C, on which the POL (for server C) is shown at load point 646. Here, prior to reconfiguring server group 600, the POL for server C is 90%, and the PSU efficiency at that load point is 89.4%, which is below the peak efficiency of about 91% for PSU C.

Table 1, shown below, shows the capacity, load, and PSU efficiency values for server group 600 prior to reconfiguration (as configured in FIG. 6A).

TABLE 1

| Group Level PSU Efficiency Prior to Reconfiguration | | | | | |
|---|---|---|---|---|---|
| PSU | Server | PSU capacity | Steady State Load (watts) | Percentage of Load (POL) | Steady State PSU Efficiency | Group Level PSU Efficiency |
| A | A | 750 | 675 | 90% | 92% | 90.8% |
| B | B | 1100 | 250 | 22% | 91% | |
| C | C | 495 | 445 | 90% | 89.4% | |

Based on these results, the group level PSU efficiency analyzer in the lead management controller determines that a different configuration of the servers and PSUs in server group 600 would result in increased PSU efficiency for the server group as a whole. In this example, these PSUs have different efficiency graphs, the loads on them are different, and none of them are operating at peak efficiency. However, by changing the configuration of the system so that the PSUs power different ones of the servers than is illustrated in FIG. 6A, the group level PSU efficiency may be increased. In this example, the reconfiguration recommendation generated by the group level PSU efficiency analyzer includes a recommendation to change the PSUs that power all three servers.

Figure 7A:
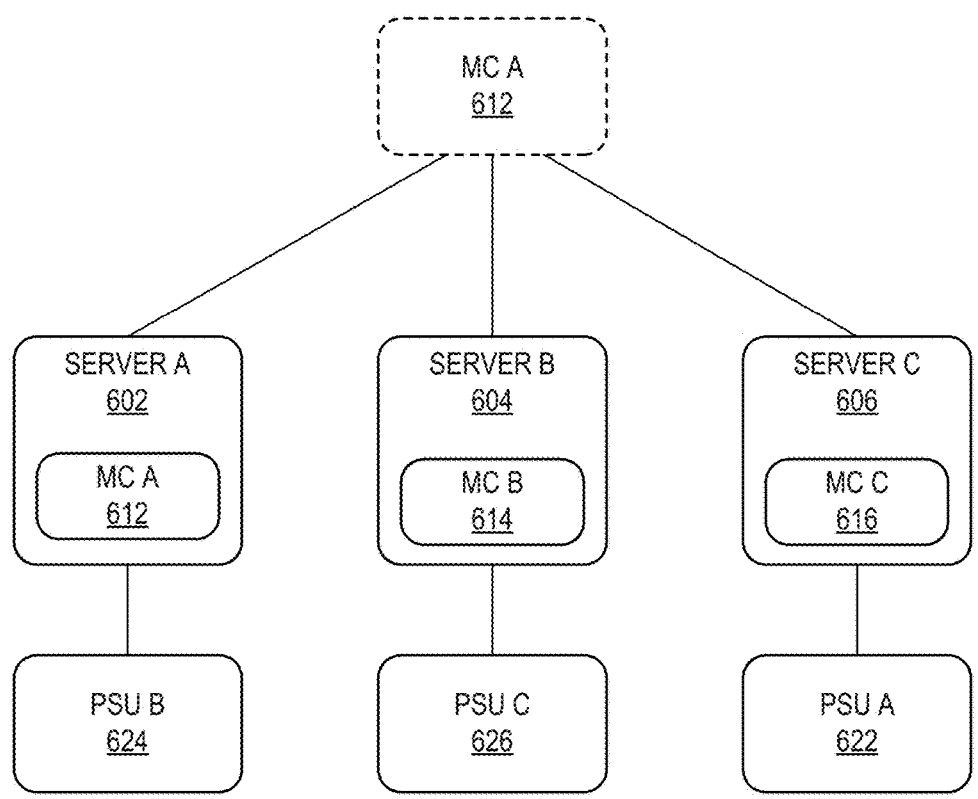
Figure 7B:
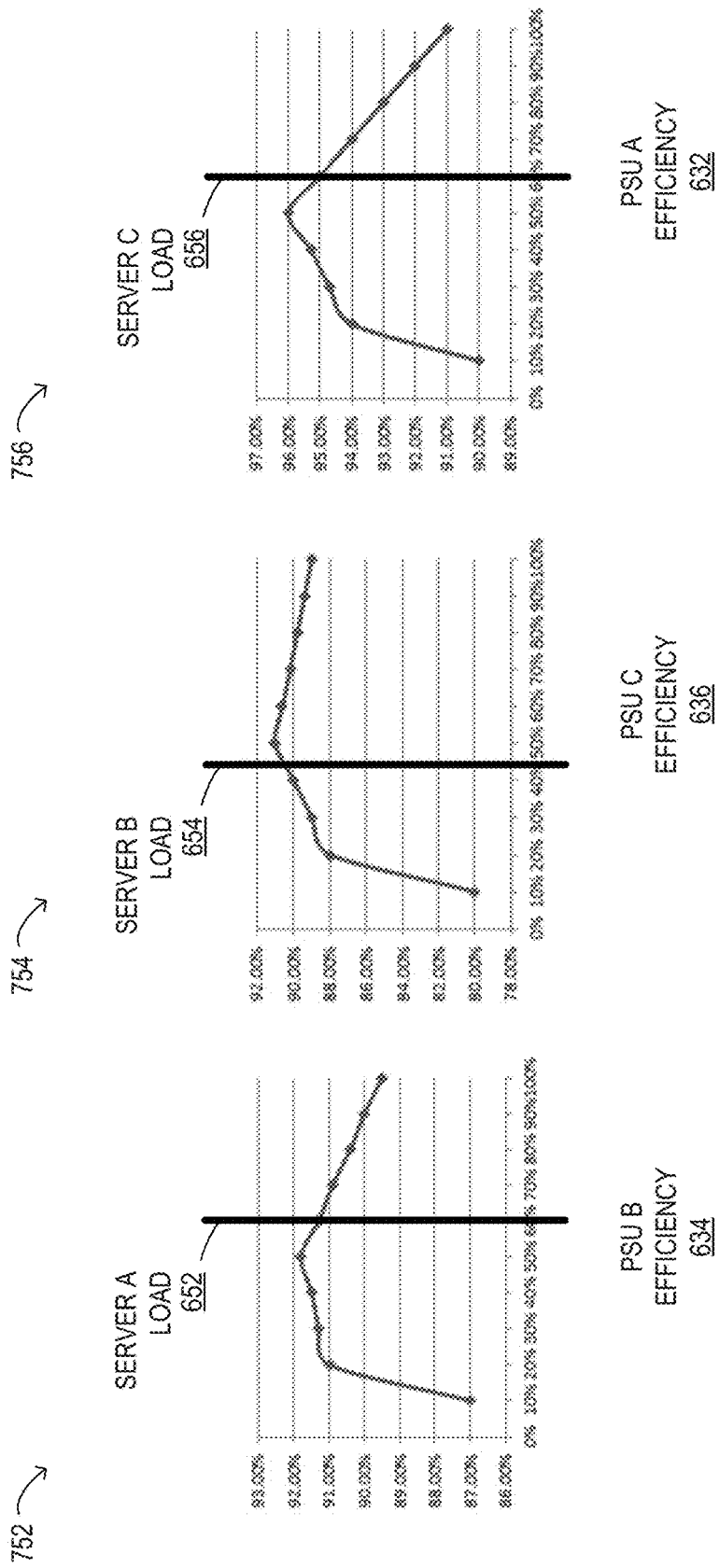

FIG. 7A illustrates the configuration of server group 600 after acting on the recommendation made by the group level PSU efficiency analyzer. Here, server A (602) is powered by PSU B (624), server B (604) is powered by PSU C (626) and server C (606) is powered by PSU A (622).

FIG. 7B again illustrates the PSU efficiency curves for the three PSUs in server group 600. However, since these PSU power different servers following the reconfiguration, the load points (and corresponding PSU efficiencies) are different than before the reconfiguration. For example, graph 752 depicts the PSU efficiency curve 634 for PSU B, on which the POL (for server A) is shown at load point 652. Here, after reconfiguring server group 600, the POL for server A is 60%, and the PSU efficiency for PSU B at that load point is 91.3%. Graph 754 depicts the PSU efficiency curve 636 for PSU C, on which the POL (for server B) is shown at load point 654. Here, after reconfiguring server group 600, the POL for server B is 44%, and the PSU efficiency for PSU C at that load point is 91%. Graph 756 depicts the PSU efficiency curve 632 for PSU A, on which the POL (for server C) is shown at load point 656. Here, after reconfiguring server group 600, the POL for server C is 60%, and the PSU efficiency for PSU A at that load point is 95%.

Table 2, shown below, shows the capacity, load, and PSU efficiency values for server group 600 after the recommended reconfiguration (as configured in FIG. 7A).

TABLE 2

| Group Level PSU Efficiency After Reconfiguration | | | | | |
|---|---|---|---|---|---|
| PSU | Server | PSU capacity | Steady State Load (watts) | Percentage of Load (POL) | Steady State PSU Efficiency | Group Level PSU Efficiency |
| B | A | 1100 | 675 | 60% | 91.3% | 92.43% |
| C | B | 495 | 250 | 44% | 91% | |
| A | C | 750 | 445 | 60% | 95% | |

In this example, by reconfiguring the components of server group 600 to better match the PSUs to the servers based on the capacities of the PSU, the load at each server, and the PSU efficiency tables (or curves) for each PSU, the group level SPU efficiency was increased by 1.63%. In this example, because the total steady state load in the server group is 1370 watts, this increase in PSU efficiency resulted in a power savings of 22.37 watts for the server group. This power savings may translate into significant cost savings, in this example.

Note that while this example involves a server group in which there is a 1-1 mapping between servers and PSUs, in other embodiments, there may be multiple PSUs powering each server, or a single PSU may power multiple servers. As described above, in these cases, a similar approach may be applied to determine the group level PSU efficiency for the server group and/or a reconfiguration recommendation for the server group. However, a larger number of server/PSU combinations may be analyzed and/or a larger number of calculations may be performed in order to analyze those combinations, in these embodiments.

Note also that the example depicted in FIGS. 6A-6B and 7A-7B includes a small number of servers and corresponding PSUs (three of each) for simplicity of illustration. In various embodiments of the present disclosure, a server group may typically include 10-20 servers and corresponding PSUs. The techniques described here may scale for application to server groups of this size or even larger (e.g., dozens of servers and PSUs), in some embodiments. In one embodiment, the maximum number of servers that can be managed by a lead management controller may be on the order of 100.

As described above, an information handling system may, in some embodiments, implement methods for analyzing and increasing group level PSU efficiency for a server group based on information about the PSUs in the server group and the loads on those PSUs that is received from management controllers on each of the servers. These techniques may be used to determine the current group level PSU efficiency for a server group, the maximum achievable group level PSU efficiency for the server group (given the loads and the capabilities of the PSUs), and/or a combination of servers and PSUs to achieve that maximum group level PSU efficiency (or at least increases the group level PSU efficiency toward that ideal). A reconfiguration recommendation based on this analysis may be output to a console or stored in a memory location from which it may be obtained and, in some cases, acted upon. in some cases, reconfiguring the server group according to the recommendation may significantly increase the group level PSU efficiency, which may result in corresponding power and/or cost savings in the server group. The analysis and recommendation processes may be repeated periodically, continuously, on an on-demand basis, or on an as-needed basis, in different embodiments.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for increasing power supply efficiency in an information handling system, comprising:
    obtaining, over a management bus through which a plurality of management controllers in the information handling system communicate with each other, for each of a plurality of power supply units in a server group in the information handling system, each power supply unit supplying power to a respective one of a plurality of servers in the server group and each management controller associated with a respective one of the plurality of servers, information including:
        a respective value representing a rated capacity of the power supply unit;
        a respective value representing a current steady state load on the power supply unit;
        data mapping load values to respective power supply efficiency values for the power supply unit;
    determining, based at least in part on the obtained information for each of the plurality of power supply units, a value representing a current group level power supply efficiency;
    determining, based at least in part on the value representing the current group level power supply efficiency, whether or not reconfiguring the server group by modifying, for at least one of the plurality of servers, which of the plurality of power supply units supplies power to the one of the plurality of servers, would increase the group level power supply efficiency; and
    generating a reconfiguration recommendation in response to determining that reconfiguring the server group would increase the group level power supply efficiency, the reconfiguration recommendation describing a change of the power supply unit supplying power to the one of the plurality of servers.

2. The method of claim 1, wherein:
the method further comprises obtaining, for each of the plurality of power supply units, a respective value of current power supply efficiency; and
determining a value representing current group level power supply efficiency comprises computing an average of the respective values of current power supply efficiency for each of the plurality of power supply units.

3. The method of claim 1, wherein:
the method further comprises calculating, for each of the plurality of power supply units, dependent on the respective value representing its current steady state load and on the data mapping load values to respective power supply efficiency values for the power supply unit, a respective value of current power supply efficiency for the power supply unit; and
determining a value representing current group level power supply efficiency comprises computing an average of the respective values of current power supply efficiency for each of the plurality of power supply units.

4. The method of claim 1, wherein determining that reconfiguring the server group would increase the group level power supply efficiency comprises:
    calculating an expected group level power supply efficiency for each of a plurality of configurations in which at least one of the plurality of servers is powered by a power supply unit other than a power supply unit that supplied power to the server in the current configuration of the server group; and
    comparing the expected group level power supply efficiencies for the plurality of configurations to the current group level power supply efficiency.

5. The method of claim 1, wherein:
determining that reconfiguring the server group would increase the group level power supply efficiency comprises:
    calculating an expected group level power supply efficiency for each of a plurality of configurations in which at least one of the plurality of servers is powered by a power supply unit other than a power supply unit that supplied power to the server in the current configuration of the server group; and generating a reconfiguration recommendation comprises:
applying a graph searching technique or a tree searching technique to results of the calculating to identify a configuration in the plurality of configurations having the highest expected group level power supply efficiency.

6. The method of claim 1, further comprising:
writing data representing the reconfiguration recommendation to a local in memory that is accessible to an administrator or user of the information handling system.

7. The method of claim 1, further comprising:
repeating, one or more times, the obtaining information, the determining a value representing current group level power supply efficiency, the determining whether or not reconfiguring the server group would increase the group level power supply efficiency, and the generating a reconfiguration recommendation.

8. The method of claim 7, wherein the repeating is performed periodically or in response to a change to a respective value representing current steady state load for one of the plurality of power supply units, a replacement of a power supply unit, or receipt of an explicit request to repeat the obtaining information, the determining a value representing current group level power supply efficiency, the determining whether or not reconfiguring the server group would increase the group level power supply efficiency, and the generating a reconfiguration recommendation.

9. An information handling system, comprising:
a plurality of servers in a server group, each including a respective management controller;
a plurality of power supply units in the sever group, each of which supplies power to a respective one of the plurality of servers in the server group;
a lead management controller for the server group; and
a management bus over which the lead management controller and the respective management controllers of the plurality of servers in the server group communicate with each other;
wherein the lead management controller comprises:
a processor; and
a memory storing program instructions that when executed by the processor cause the processor to implement a group level power supply efficiency analyzer to:
obtain, for each of the plurality of power supply units, information including:
a respective value representing a rated capacity of the power supply unit;
a respective value representing a current steady state load on the power supply unit;
data mapping load values to respective power supply efficiency values for the power supply unit;
determine, based at least in part on the obtained information for each of the plurality of power supply units, a value representing a current group level power supply efficiency;
determine, based at least in part on the value representing the current group level power supply efficiency, whether or not reconfiguring the server group by modifying, for at least one of the plurality of servers, which of the plurality of power supply units supplies power to the one of the plurality of servers, would increase the group level power supply efficiency over the current group level power supply efficiency; and
generate, responsive to a determination that reconfiguring the server group would increase the group level power supply efficiency over the current group level power supply efficiency, a reconfiguration recommendation for the server group, the reconfiguration recommendation describing a change of the power supply unit supplying power to the one of the plurality of servers.

10. The information handling system of claim 9, wherein:
when executed by the processor, the program instructions further cause the processor to:
refrain from generating a reconfiguration recommendation for the server group responsive to a determination that reconfiguring the server group would not increase the group level power supply efficiency over the current group level power supply efficiency.

11. The information handling system of claim 9, wherein when executed by the processor, the program instructions further cause the processor to store one or more of the obtained information for each of the plurality of power supply units, the value representing current group level power supply efficiency, or the reconfiguration recommendation in the memory in the lead management controller.

12. The information handling system of claim 9, wherein:
to obtain the information for each of the plurality of power supply units, the group level power supply efficiency analyzer receives, from each of the respective management controllers in the server group over the management bus, the information for a power supply that supplies power to the server on which the respective management controller resides.

13. The information handling system of claim 9, wherein the obtained information for each of the plurality of power supply units comprises vendor-supplied information stored in a memory on the power supply unit.

14. The information handling system of claim 9, wherein the lead management controller comprises one of the respective management controllers of the plurality of servers in the server group that has assumed the role of lead management controller for the server group.

15. The information handling system of claim 9, wherein:
when executed by the processor, the program instructions further cause the processor to calculate, for each of the plurality of power supply units, a respective value of current power supply efficiency; and
to determine a value representing current group level power supply efficiency, the group level power supply efficiency analyzer computes an average of the respective values of current power supply efficiency for each of the plurality of power supply units.

16. The information handling system of claim 9, wherein to determine that reconfiguring the server group would increase the group level power supply efficiency, the group level power supply efficiency analyzer:
calculates an expected group level power supply efficiency for each of a plurality of configurations in which at least one of the plurality of servers is powered by a power supply unit other than a power supply unit that supplied power to the server in the current configuration of the server group; and
compares the expected group level power supply efficiencies for the plurality of configurations to the current group level power supply efficiency.

17. A management controller, comprising:
a management controller network interface through which the management controller communicates with one or more other management controllers; and
a group level power supply efficiency analyzer, the group level power supply efficiency analyzer including circuitry or logic to:
  obtain, through the management controller network interface, for each of a plurality of power supply units in a server group, each of which supplies power to a respective one of a plurality of servers, information including:
    a respective value representing a rated capacity of the power supply unit;
    a respective value representing a current steady state load on the power supply unit;
    data mapping load values to respective power supply efficiency values for the power supply unit;
  determine, based at least in part on the obtained information for each of the plurality of power supply units, a value representing a current group level power supply efficiency;
  determine, based at least in part on the value representing the current group level power supply efficiency, whether or not reconfiguring the server group by modifying, for at least one of the plurality of servers, which of the plurality of power supply units supplies power to the one of the plurality of servers, would increase the group level power supply efficiency over the current group level power supply efficiency; and
  generate, responsive to a determination that reconfiguring the server group would increase the group level power supply efficiency over the current group level power supply efficiency, a reconfiguration recommendation for the server group, the reconfiguration recommendation describing a change of the power supply unit supplying power to the one of the plurality of servers.

18. The management controller of claim 17, wherein:
the group level power supply efficiency analyzer further includes circuitry or logic to calculate, for each of the plurality of power supply units, a respective value of current power supply efficiency; and
to determine a value representing current group level power supply efficiency, the group level power supply efficiency analyzer includes circuitry or logic to compute an average of the respective values of current power supply efficiency for each of the plurality of power supply units.

19. The management controller of claim 17, wherein to determine that reconfiguring the server group would increase the group level power supply efficiency, the group level power supply efficiency analyzer further includes circuitry or logic to:
  calculate an expected group level power supply efficiency for each of a plurality of configurations in which at least one of the plurality of servers is powered by a power supply unit other than a power supply unit that supplied power to the server in the current configuration of the server group; and
  apply a graph searching technique or a tree searching technique to results of the calculating to identify a configuration in the plurality of configurations having the highest expected group level power supply efficiency.

20. The management controller of claim 17, wherein the management controller comprises a remote access controller.

* * * * *